(12) United States Patent
Dunietz et al.

(10) Patent No.: US 7,523,392 B2
(45) Date of Patent: Apr. 21, 2009

(54) METHOD AND SYSTEM FOR MAPPING BETWEEN COMPONENTS OF A PACKAGING MODEL AND FEATURES OF A PHYSICAL REPRESENTATION OF A PACKAGE

(75) Inventors: Jerry J. Dunietz, Seattle, WA (US); Josh Pollock, Seattle, WA (US); Isaac E. Nichols, Kirkland, WA (US); Oliver H. Foehr, Mercer Island, WA (US); Charels S. Walker, Sammamish, WA (US); Kirk N. Shoop, Seattle, WA (US); David B. Ornstein, Seattle, WA (US); Sarjana Sheth, Redmond, WA (US); Andrey Shur, Redmond, WA (US); Jean-Marie H. Larcheveque, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 486 days.

(21) Appl. No.: 11/112,602

(22) Filed: Apr. 22, 2005

(65) Prior Publication Data

US 2006/0242566 A1 Oct. 26, 2006

(51) Int. Cl.
*G06N 3/00* (2006.01)
(52) U.S. Cl. ...................................................... 715/234
(58) Field of Classification Search ................ 715/513, 715/517, 523, 530, 234, 243, 254, 255
See application file for complete search history.

(56) References Cited

U.S. PATENT DOCUMENTS

| | | | | |
|---|---|---|---|---|
| 7,310,646 | B2 * | 12/2007 | Rangadass et al. | 707/100 |
| 2002/0165872 | A1 | 11/2002 | Meltzer et al. | |
| 2003/0004971 | A1 | 1/2003 | Gong et al. | |
| 2003/0126128 | A1 * | 7/2003 | Watson | 707/5 |
| 2003/0204670 | A1 * | 10/2003 | Holt et al. | 711/112 |
| 2005/0021541 | A1 | 1/2005 | Rangadass et al. | |

OTHER PUBLICATIONS

International Search Report dated Nov. 19, 2007.

* cited by examiner

*Primary Examiner*—Stephen S Hong
*Assistant Examiner*—Kyle Stork
(74) *Attorney, Agent, or Firm*—Shook, Hardy & Bacon L.L.P.

(57) ABSTRACT

Methods and systems for mapping between components of a packaging model and features of a physical representation of a package are provided. Components of a packaging model may include, by way of example only, a part name, a content type, the contents of a part, and/or a growth hint. Physical representations of a package may include, by way of example only, physical persistence formats and/or various transports, e.g., network-based protocols. Computer-readable media having computer-executable instructions for performing the disclosed methods, as well as computers programmed to perform the disclosed methods, are also provided.

16 Claims, 9 Drawing Sheets

METHOD AND SYSTEM FOR MAPPING BETWEEN COMPONENTS OF A PACKAGING MODEL AND FEATURES OF A PHYSICAL REPRESENTATION OF A PACKAGE

CROSS-REFERENCE TO RELATED APPLICATIONS

Not Applicable.

STATEMENT REGARDING FEDERALLY SPONSORED RESEARCH OR DEVELOPMENT

Not Applicable.

TECHNICAL FIELD

The present invention relates to computing environments. More particularly, embodiments of the present invention relate to methods for mapping between components of a packaging model and features of a physical representation of a package. Components of a packaging model may include, by way of example only, a part name, a content type, the contents of a part, and/or a growth hint. Physical representations of a package may include, by way of example only, physical persistence formats and/or various transports, e.g., network-based protocols.

BACKGROUND OF THE INVENTION

Typically, packaging models for organizing data are tied to the physical formats to which they directly correspond. For instance, a packing model for packaging ZIP archives is directly tied to the format of a ZIP archive so that direct correlations between the packaging model and the physical format are readily determined. However, if one wanted to instead convert the package having this format to, for instance, a network-based protocol, it would be extremely difficult to accomplish.

Accordingly, a packaging model that defines an abstraction, independent of any particular physical format, that may be mapped to a variety of different physical representations would be desirable. Additionally, a method for mapping the abstract packaging model to each of a number of physical representations would be advantageous.

BRIEF SUMMARY OF THE INVENTION

Embodiments of the present invention relate to methods for mapping between components of a packaging model and features of a physical representation of a package having at least one part. In one embodiment, the method includes identifying one or more components of the packaging model, identifying a feature of the physical representation which corresponds to each of the one or more components identified, and mapping the one or more components of the packaging model to the corresponding feature of the physical representation. Further embodiments of the present invention relate methods for mapping between components of a packaging model and features of a physical representation of a package having at least one part, the components including at least a part name, a part content type, and contents of a part. In one embodiment, the method includes identifying a feature of the physical representation which corresponds to each of the part name, the part content type, and the contents of the part and mapping each of the part name, the part content type, and the contents of the part to the feature of the physical representation which corresponds thereto. If desired, the components of the packaging model may further include a growth hint. In this embodiment, the method further includes identifying a feature of the physical representation which corresponds to the growth hint and mapping the growth hint to the identified feature.

Still further, embodiments of the present invention relate to computer-readable media having computer-executable instructions for performing the methods disclosed herein, as well as to computers programmed to perform the disclosed methods.

Additional embodiments of the present invention relate to a computer system for mapping between components of a packaging model and features of a physical representation of a package having at least one part. In one embodiment, the computer system includes means for identifying one or more components of the packaging model, means for identifying a feature of the physical representation which corresponds to each of the one or more components identified, and means for mapping the one or more components of the packaging model to the corresponding feature of the physical representation.

BRIEF DESCRIPTION OF THE SEVERAL VIEWS OF THE DRAWING

The present invention is described in detail below with reference to the attached drawing figures, wherein.

DETAILED DESCRIPTION OF THE INVENTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide methods for mapping between components of a packaging model and features of a physical representation of a package. Components of a packaging model may include, by way of example only, a part name, a content type, the contents of a part, and/or a growth hint. Physical representations of a package may include, by way of example only, physical persistence formats and/or various transports, e.g., network-based protocols.

Having briefly described an overview of the present invention, an exemplary operating environment for the present invention is described below.

Figure 1:
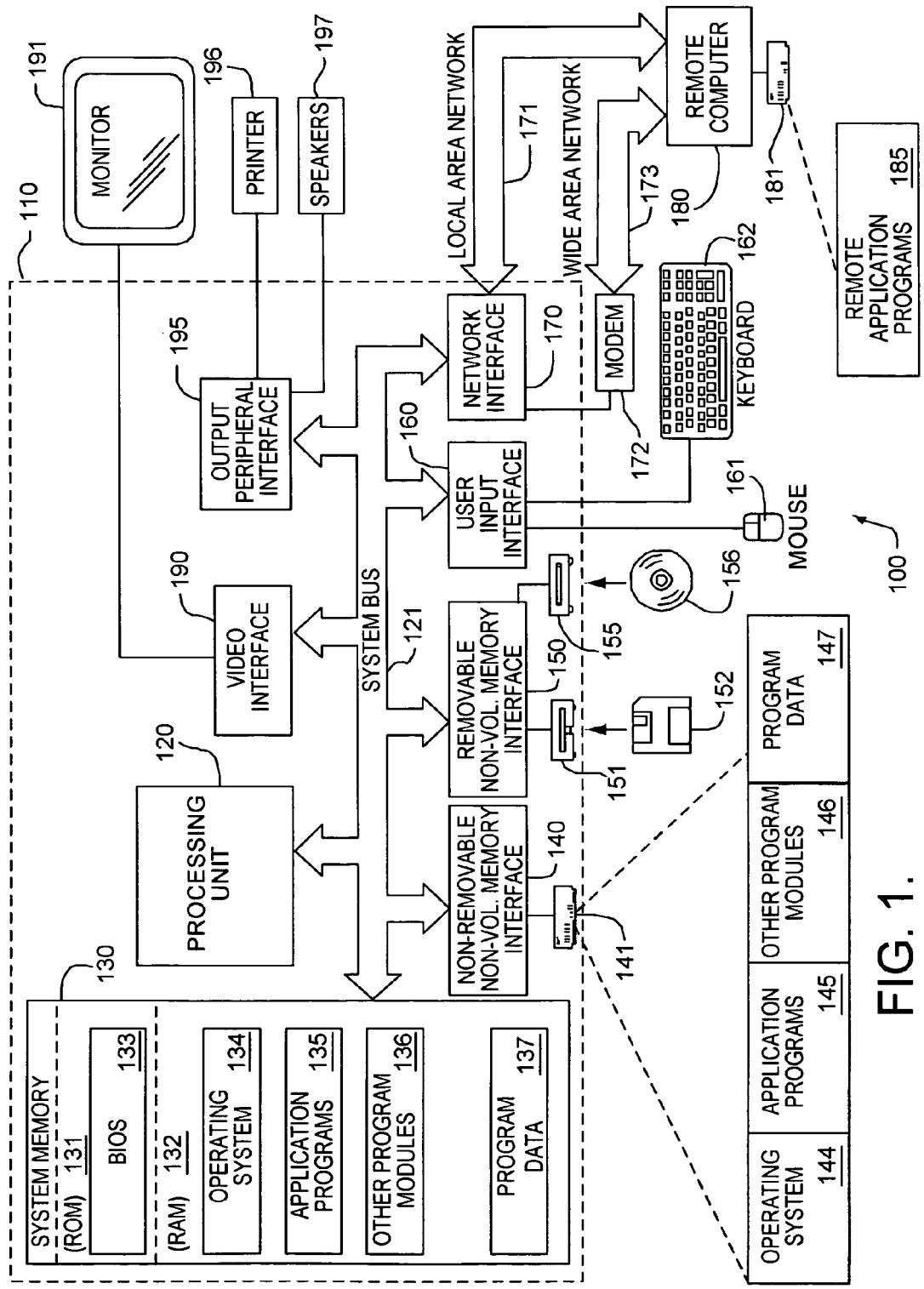
FIG. 1 is a block diagram of an exemplary computing environment suitable for use in implementing the present invention.

Referring to the drawings in general and initially to FIG. 1 in particular, wherein like reference numerals identify like components in the various figures, an exemplary operating environment for implementing the present invention is shown and designated generally as computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the present invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system (BIOS) 133, containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks (DVDs), digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other programs 146 and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the network interface 170, or other appropriate mechanism. In a networked environment, program modules depicted relative to the computer 110, or portions thereof, may be stored in a remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

When the computer 110 is turned on or reset, the BIOS 133, which is stored in the ROM 131, instructs the processing unit 120 to load the operating system, or necessary portion thereof, from the hard disk drive 141 into the RAM 132. Once the copied portion of the operating system, designated as operating system 144, is loaded in RAM 132, the processing unit 120 executes the operating system code and causes the visual elements associated with the user interface of the operating system 134 to be displayed on the monitor 191. Typically, when an application program 145 is opened by a user, the program code and relevant data are read from the hard disk drive 141 and the necessary portions are copied into RAM 132, the copied portion represented herein by reference numeral 135.

Figure 2:
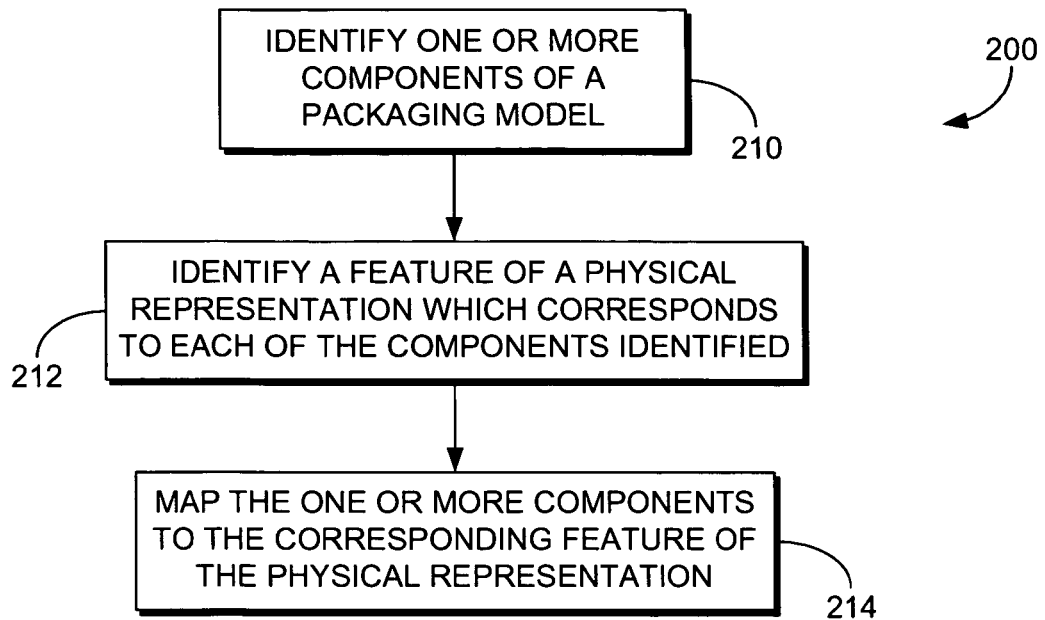
FIG. 2 is a flow diagram showing a method for mapping between components of a packaging model and features of a physical representation of a package in accordance with an embodiment of the present invention.

As previously mentioned, in one embodiment, the present invention relates to a method for mapping between components of a packaging model and features of a physical representation of a package. With reference to the figures in general, and initially to FIG. 2 in particular, a flow diagram is illustrated which shows a method 200 for mapping between components of a packaging model and features of a physical representation of a package in accordance with an embodiment of the present invention. Components of a packaging model may include, by way of example only, a part name, a content type, the contents of a part, and/or a growth hint. Physical representations of a package may include, by way of example only, physical persistence formats and/or various transports, e.g., network-based protocols. An exemplary abstract packaging model that may be used in the methods herein described is more fully described below.

Initially, as indicated at block 210, one or more components of the packaging model are identified. Subsequently, a feature of the desired physical representation which corresponds to each of the identified components is identified, as indicated at block 212. Once the packaging model components and corresponding physical representation features are identified, the one or more components are mapped to the corresponding features, as indicated at block 214. Particular mechanics of mapping between packaging model components and corresponding physical representation features is more fully described below with reference to an exemplary abstract packaging model herein described.

The exemplary abstract packaging model specifies the way in which parts of a document (or other types of content) are named and related. Content within the exemplary model herein described is held within a package. A package is a logical entity that holds a collection of related parts. The package's purpose is to gather up all of the pieces of a document into one object that is easy for programmers and end-users to utilize. For instance, a package holding a document with a picture might contain two parts: an Extensible Markup Language (XML) markup part representing the document and another part representing the picture.

In addition to content, a part consists of common properties and a stream of bytes. This is analogous to a file in a file system or a resource on a Hypertext Transfer Protocol (HTTP) server. Common properties include the name of the part, the type of content stored in the part (content type), the contents of the part, and optionally a growth hint (a suggested number of bytes to reserve for the part to grow in-place). Each of these properties is more fully described below.

Parts have part names. Like in file systems and the like, part names are hierarchical. Part names are divided up into segments, each representing a level in this hierarchy. For example, the part name /hello/world/doc.xml contains three segments: "hello", "world", and "doc.xml". The segments can be seen to form a tree. This is analogous to what happens in file systems, in which all of the non-leaf nodes in the tree are folders and the leaf nodes are the actual files containing content. These folder-like nodes (i.e., non-leaf nodes) in the name tree serve a similar function of organizing the parts in the package. Note that folder-like nodes, or "folders", exist only as a concept in the naming hierarchy. Folders are not explicitly represented in the packaging model, and no directory of folders exists in the packaging model. However, physical representations may have an explicit representation of folders, and this representation may be in the form of a hierarchical directory.

The exact form a part name takes depends on the context in which the name is being used (for example, in a Uniform Resource Identifier (URI) referencing a part from outside of a package, used to label a part's data in a physical package format, etc.). Parts may have a Unicode part name which is a Unicode string which identifies the part within a package. Unicode part names correctly represent the full range of international characters and are human-readable. While Unicode part names provide the most international-friendly representation of part names, Unicode characters are not allowed in all contexts. In particular, parts are often referenced using URIs and URIs cannot contain Unicode characters. Instead, the Unicode characters must be converted to an ASCII-compatible representation. Thus, parts may alternatively have an ASCII part name which is a part name having international characters encoded in ASCII using IRI/URI-style escaping. ASCII part names are used to refer to parts in the context of a package.

Parts within a package must be named uniquely. In order to ensure proper handling of international characters in part names, the equivalence of part names must be determined only at the Unicode level. If the Unicode part names are equivalent, then they refer to the same part in the package. Unicode part names are considered equivalent if their normalized forms are byte-for-byte identical. Normalization from an ASCII part name may be understood with reference to FIG. 10.

Figure 10:
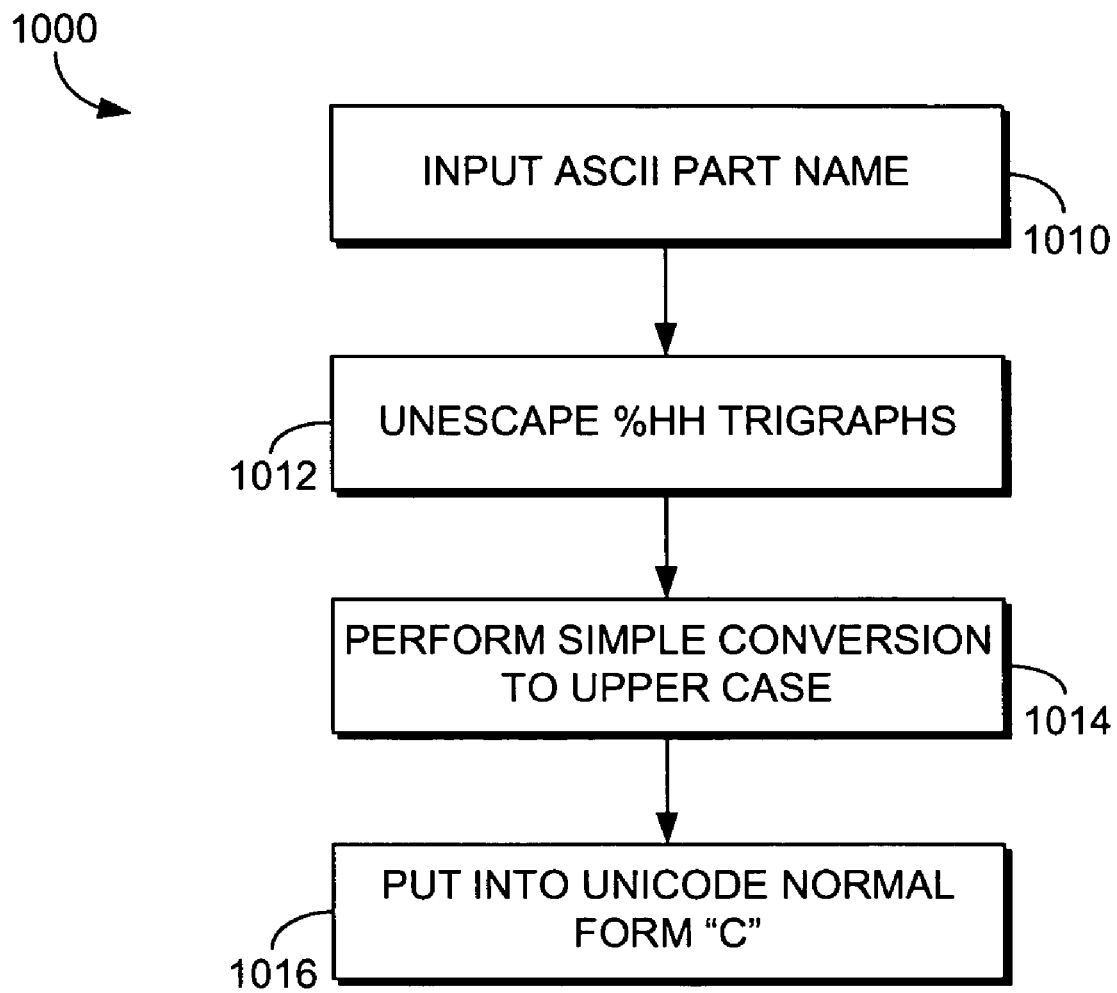
FIG. 10 is a flow diagram showing a method for normalizing an ASCII part name into a normalized Unicode part name.

FIG. 10 is a flow diagram showing a method for normalizing an ASCII part name into a normalized Unicode part name, the method being designated generally as reference numeral 1000. Initially, the ASCII part name is input, as indicated at block 1012. Subsequently, all % HH trigraphs are un-escaped, as indicated at block 1014, and a simple conversion is performed to upper case, as indicated at block 1016. Next, normalization is performed into Unicode Normal Form "C", as indicated at block 1018.

Often parts will contain references to other parts. As a simple example, imagine a package with two parts: a markup file and an image. The markup file will want to hold a reference to the image so that when the markup file is processed, the associated image can be identified and located.

The second common property of parts mentioned above is content type. Every part has a content type which identifies what type of content is stored in a part. Content types may include, by way of example only, image/jpeg, and application/xml. Content types are well-structured ASCII strings with limited sets of characters.

The third common property of parts mentioned above is the contents of the part itself. This property is self-explanatory.

The fourth common property of parts mentioned above is a growth hint. In some scenarios, a part may be modified after it is placed into a package. Depending on the nature of the modification, the part might need to grow. For some physical package formats, this could be an expensive operation and, further, could damage an otherwise well-efficiently-interleaved package. Ideally, it would be possible to enlarge the part, in place, without having to move around many of the bytes in the package.

To support these scenarios efficiently, a growth hint may be associated with each part. This hint identifies a number of bytes that the creator of the part imagines may be useful for the part to be able to grow while maintaining the efficiencies of in-place updating. In the physical mapping to a particular physical package format, this information may be used to reserve space to allow the part to grow. In particular, this number is only a hint and physical mappings may choose to provide no such reserved space or to adhere only loosely to the hint. In the exemplary abstract packaging model described herein, the growth hint is optional and is set when the part is created.

As previously mentioned, parts will often contain references to other parts in a package and resources outside of the package. In general, however, these references will be represented inside the referring part in ways that are specific to the content type of the part, that is, in arbitrary markup of an application-specific encoding.

Relationships provide a way to represent the kind of connection between a source part and a target resource. Relationships make the connections directly "discoverable" without looking at the content in the parts, so they are independent of content-specific schema and faster to resolve.

Relationships also provide a second important function, that of allowing parts to be related without modifying them. Sometimes this information serves as a form of "annotation" where the content type of the "annotated" part does not define a way to attach the given information. Finally, some scenarios require information to be attached to an existing part specifically without modifying that part—either because the part is encrypted and cannot be decrypted or because it is digitally signed and changing it would invalidate the signature.

Relationships are represented using XML in relationship parts. Each part in the physical representation that is the source of one or more relationships has an associated relationship part which holds the list of relationships for the source part. Relationships may also target resources outside the package at some absolute location and/or resources located relative to the current location of a package entity.

Relationship may also take the form of package relationships. Package relationships are used to find well-known parts in a package. The source of a package relationship is not a part but the package as a whole. Package relationships may be named using the naming conventions applicable for relationship parts.

Often a package will be a single file which may be referred to as a container. This gives end-users, for example, a convenient way to distribute their documents with all of the component pieces of the document (e.g., images, fonts, data, etc.). While packages often correspond directly to a single file, this is not necessarily always so. A package is a logical entity that may be represented physically in a variety of ways, for instance, in a single file, in a collection of loose files, in a database, ephemerally in transit over a network connection, and the like. Thus, all containers hold packages but not all packages are stored in containers.

Packages are produced or consumed in the exemplary abstract packaging model herein described using a combination of access style, layout style, and communication style. Access styles include, by way of example only, streaming consumption which allows readers to begin processing parts before the entire package has arrived, streaming creation which allows writers to begin writing parts to the package without knowing, in advance, all of the parts that will be written, or simultaneous streaming creation and consumption which allows streaming creation and streaming consumption to happen at the same time on the same package.

Layout styles include, by way of example only, simple ordering wherein all of the bytes for part N appear in the package before the bytes for part N+1, or interleaved wherein the bytes for multiple parts are interleaved. Simple ordering and interleaving were previously described with reference to FIGS. 10A-10C.

Communication styles include, by way of example only, sequential delivery wherein all of part N is delivered to a reader before part N+1, or random-access delivery wherein a reader can request the delivery of a part out of sequential order. At least one style from each of these three categories is used when mapping utilizing the exemplary abstract packaging model herein described.

The exemplary abstract packaging model described herein only describes an abstraction. The physical representation of a package is created by mapping the components of a packaging model to features of a particular physical representation in accordance with embodiments of the method of the present invention. Thus, the structure and functionality of the framework in which the methods herein described may be utilized are represented not only by a packaging model but by a physical model as well. The physical model defines the various ways in which a package is used by writers and readers.

Physical models are generally based on three components: a writer, a reader, and a pipe between them. The pipe carries data from the writer to the reader. In many scenarios, the pipe is simply the Application Programming Interface (API) calls that the reader makes to read the package from the local file system. This is called direct access. Often, however, the reader and the writer must communicate with each other over a protocol of some sort. This communication might be happening, for instance, across a process boundary or between a server and a desktop computer. This is called networked access.

All physical packages hold a collection of parts. These parts can be laid out in one of two styles: simple ordering and interleaved. With simple ordering, the parts in the package are laid out with a defined ordering. When such a package is delivered in a pure linear fashion, starting with the first byte in the package through to the last, all of the bytes for the first part arrive first, then all of the bytes for the second part, and so on. With interleaved layout, the bytes of the multiple parts are interleaved, allowing optimal performance in certain scenarios. Two scenarios that benefit significantly from interleaving are multi-media playback (e.g., delivering vide and audio at the same time) and inline resource reference (e.g., a reference in the middle of a markup file to an image).

Interleaving is handled through a special convention for organizing the contents of interleaved parts. By breaking parts into pieces and interleaving these pieces, it is possible to achieve the desired results of interleaving—while still making it possible to easily reconstruct the original larger part.

Figure 9A:
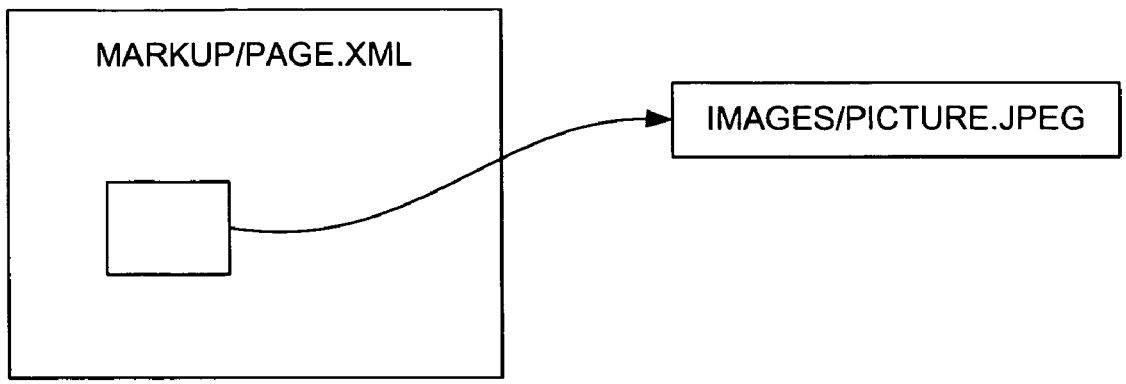
FIGS. 9A-9C are a schematic drawing of (A) markup referring to an image, (B) a part layout using simple ordering, and (C) a part layout using interleaving.
Figure 9B:
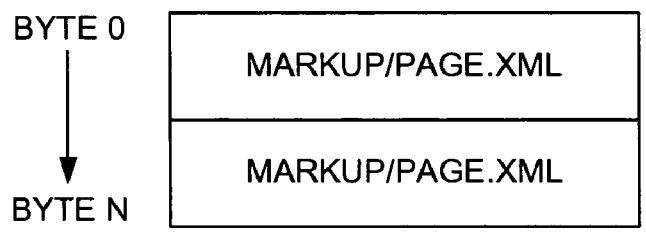

To understand how interleaving works, imagine a simple example (see FIG. 9A) involving two parts: markup/page.xml and images/picture.jpeg. markup/page.xml describes the contents of a page and in the middle of that page is a reference to an image (images/picture.jpeg) that should appear on the page. To understand why interleaving is valuable, consider how these parts would be arranged in a package using simple ordering (FIG. 9B). A reader that is processing this package (and is receiving bytes sequentially) will be unable to display the picture until it has received all of the markup/page.xml part as well as the images/picture.jpeg. In some circumstances (e.g., small or simple packages or a fast communications link), this may not be a problem. In other circumstances, however (e.g., if markup/page.xml was very large or the communications link was very slow), needing to read through all of the markup/page.xml part to get to the image will result in unacceptable performance or place unreasonable memory demands on the reader system.

Figure 9C:
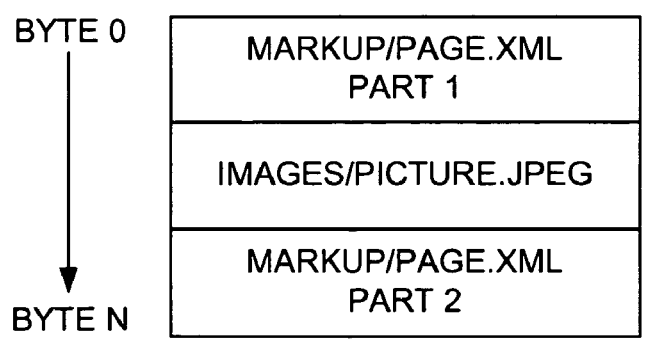

In order to achieve closer to ideal performance, it would be beneficial to be able to split the markup/page.xml part and insert the images/picture.jpeg part into the middle, right after where the picture is referenced. This would allow the reader to begin processing the image earlier—as soon as it encounters the reference, the image data follows. This would produce the package layout shown in FIG. 9C.

Because of the performance benefits, physical packages supporting interleaving are beneficial. However, depending on the kind of physical package being used, interleaving may or may not be supported. Further, different physical packages may handle the internal representation of interleaving differently. Regardless of how the physical package handles interleaving, a part broken into multiple pieces in the physical file is still one logical part; the pieces themselves are not parts.

A physical package format may be described as a mapping from the components of the packaging model to the features of a particular physical representation. Packaging models, e.g., the exemplary abstract packaging model described herein, do not typically specify which physical package formats should be used for archiving, distributing, or spooling purposes. Only the logical structure is specified. A package may be "physically" embodied by a collection of loose files, a ZIP file archive, an OLE compound file, or some other format. The format chosen, however, must be supported by the targeted consuming device or by a driver for the device for mapping to be successful.

There exist many physical package formats whose features partially match the exemplary abstract packaging model components. In defining mappings from the exemplary abstract packaging model to such storage formats, it may be desirable to take advantage of any similarities between the exemplary abstract packaging model and the physical package medium, while using layers of mapping to provide additional capabilities not inherently present in the physical package medium. For instance, some physical package formats may store individual parts as individual files in a file system. In such a physical format, it may be desirable to map many part names directly to identical physical file names. (Note that part names using characters which are not valid file system file names may require some kind of escaping mechanism.)

In many cases, a single common mapping problem may be faced by the designers of different physical package formats. Two examples of common mapping problems arise when associating arbitrary content types with parts, and when supporting interleaved layout style. Described below are exemplary solutions to such common mapping problems that designers may choose to implement. It will be understood by those of ordinary skill in the art that the solutions are merely exemplary and are not intended to limit the scope of the invention in any way.

Every physical package format mapping utilizing the exemplary abstract packaging model described herein will define a mechanism for associating content types with parts. Some physical package formats have a native mechanism for representing content types (for example, the content type header in Multipurpose Internet Mail Extensions (MIME)). For such physical packages, it may be desirable for the mapping to use the native mechanism to represent content types for parts.

For all other physical package formats, some other mechanism is required to represent content types. One mechanism for representing content types in these packages is by including a specially-named XML stream in the package, known as the content types stream. This stream, by definition, is not a part, and is therefore not itself addressable in the exemplary abstract packaging model. (However, it can be interleaved in the physical package using the same mechanisms for interleaving parts.)

The content types stream contains XML with a top level "types" element, and one or more "default" and "override" sub-elements. The default sub-elements define default mappings from the extensions of part names (e.g., file extensions) to content types. This takes advantage of the fact that file extensions often (but not always) correspond to content type. Override sub-elements are used to specify content types on parts that are not covered by, or are not consistent with, the default mappings. Package writers may use default sub-elements to reduce the number of per-part override sub-elements if desired.

Default sub-elements include a part name extension and a content type which indicates the content type of any matching parts (unless overridden by an override sub-element, as more fully described below). A default sub-element matches any part whose name ends with a period followed by the attribute's value. Override sub-elements include a part name URI and a content type which indicates the content type of the matching part. An override sub-element matches the part whose name is equivalent to the attribute's value.

For every part in the package, the content types stream contains either one matching default sub-element, one matching override sub-element, or both a matching default sub-element and a matching override sub-element (in which case the override sub-elements takes precedence). There may be at most one default sub-element for any given extension and at most one override sub-element for any given part name.

The order of default and override sub-elements in the content types stream is not significant. However, in interleaved packages, as more fully described below, the default and override sub-elements are written in the physical package before the part(s) to which they correspond. Default content type mappings may be defined in the content types stream even if no currently existing parts use them.

As previously mentioned, in addition to associating arbitrary content types with parts, another common mapping problem arises when supporting interleaved layout style. Not all physical packages natively support interleaving of the data streams of parts. For layout scenarios that support streaming consumption, it may be desirable that a mapping to any such physical package uses the general mechanism described herein to allow interleaving of parts.

The presently described interleaving mechanism breaks the data stream of a part into multiple pieces that can then be interleaved with pieces of other parts, or interleaved with whole parts. The individual pieces are named using a unique mapping from the part name, as more fully described below. This enables a reader to join the pieces together in their original order, forming the data stream of the part.

The individual pieces of a part only exist in the physical mapping and are not addressable in the packaging model.

An individual part is either stored interleaved or non-interleaved. Mixing of interleaving and non-interleaving for an individual part is invalid in the exemplary abstract packaging model described herein.

Grammar for deriving piece names for a given part is as follows:
piece_name=part_name "/" "["1*digit "]" [".last"] ".piece"

Piece_names generated by the above grammar have a number of requirements. First, the piece numbers must start with zero, and must be non-negative, consecutive decimal integer numbers. Piece numbers cannot be left-zero-padded. Second, the last piece of the set of pieces of a part has to contain "last" in the piece name before "piece". Third, the piece name is generated from the name of the logical part before mapping to names in the physical package. And fourth, although it is not necessary to store pieces in their natural order, it may be desirable to provide optimal efficiency.

A physical package containing interleaved (pieced) parts may also contain non-interleaved (one-piece) parts, if desired.

To create the original data from interleaved pieces, the consuming application orders the pieces by ascending piece numbers. All required pieces from piece [0].piece to [N].last.piece must be obtained and ordered without gaps. The consuming application may then concatenate the binary data contained in each piece.

EXAMPLES

The following are examples of specific mappings between the exemplary abstract packaging model hereinabove described and a number of physical representations, namely items in a ZIP archive, and loose files in a WINDOWS file system available from Microsoft Corporation of Redmond, Wash. Additionally, examples of various operations that may be performed when mapping are also provided, namely opening a package, retrieving a part based on a specified Unicode string, creating a part based on a specified Unicode string and a content type, and removing a part based upon a specified Unicode string. It will be understood and appreciated by those of ordinary skill in the art that the examples are provided by way of example only and are not intended to limit the scope of the present invention in any way.

When stored in a physical format, parts may be represented as one or many items. The names used to identify these items may have different formats, but follow the rules described herein in order to be reliably mapped to their corresponding parts.

Each physical mapping supports one-to-one mapping between parts in a package and parts stored as physical entities. The exact physical mapping operations are specific to the physical adapter and entities. Additionally, each physical mapping supports one-to-many mapping between parts in a package and parts stored as physical entities to support interleaving scenarios. Each physical mapping further guarantees that different entities in storage do not have equivalent part names when mapped to the package context and is capable of deriving the part name from the physical entity.

Example 1

Mapping to a ZIP Archive

A ZIP archive contains ZIP archive items. ZIP archive items typically become files when the archive is unzipped. When a user un-zips a ZIP-based package, the user will see an organized set of files and folders in the file system, roughly reflecting the parts in the package and their hierarchical naming structure, respectively. That is, the logical part component is physically represented by the ZIP archive item. The logical part name component is physically stored in the archive item header in the ZIP central directory. Conversion rules may be used to map between ASCII part names and ZIP archive item names, as more fully described below. The logical part content type component is physically represented by a ZIP archive item containing XML that identifies the content type for each part. And, the logical growth hint component is physically represented by padding reserved in a ZIP extra field in a local header that precedes the archive item.

In a ZIP archive, the data associated with a part is represented as one or more archive items. A non-interleaved part is stored as a single ZIP archive item. When interleaved, a part is represented as one or more pieces, using the methods described above. Pieces are named using the specified pattern, making it possible to rebuild the entire part from its constituent pieces. Each piece is stored within a ZIP archive as a single ZIP archive item.

In the ZIP archive, the chunk of bits that represents an item is stored contiguously. The sequence of ZIP items may be intentionally ordered in the ZIP archive to enable an efficient organization of the part data (e.g., to achieve correct and/or optimal interleaving).

For various operations, it may be necessary for the ASCII part name to be converted to a ZIP archive item name. To do this, the leading "1" character at the beginning of the ASCII part name is removed. Alternatively, if it is necessary to convert a ZIP archive item name to an ASCII part name, a "/" may be added to the beginning of the ASCII part name.

The combined length of the item name, extra field, and comment fields cannot exceed 65,535 bytes in the ZIP archive. Accordingly, part names stored in ZIP archives are limited to some length less than 65,535 characters, depending on how big the extra field and comment fields are.

Additionally, limitations of the file system should be accommodated when creating names for parts that may be stored in ZIP files. While there are different limitations on different file systems, two examples of these limitations include: (A) on a WINDOWS file system, the characters "*" and ":" are not valid, so parts named with these characters will not unzip successfully, and (B) on a WINDOWS file system, many programs can only deal with full file name paths (including the path) that are less than 256 characters long; parts with names longer than this may not behave properly once unzipped.

Part content types in the exemplary abstract packaging model described herein are used for associating content types with part data. In ZIP archives, content type information is stored using a mapping pattern that stores this information in a single XML stream. Content type data is stored in an archive item named "[Content_Types].xml". This archive item contains XML data that maps ASCII part names to a content type. This archive item, not being a part, does not have a content type of its own. The "[Content_Types].xml" item can be broken into multiple items and subsequently interleaved by using the "Piece" naming pattern hereinabove described.

In a ZIP archive, the growth hint is used to reserve additional bytes that can be used to grown an archive item in place. The padding is stored in an "extra field" having the following structure: [2 bytes] header ID, [2 bytes] length of extra field, [2 bytes] signature (for verification), [2 bytes] padding initial value, and [padding length] <padding>. The values of each of these fields are as follows: ID=A220, length=the signature length (2 bytes)+the padding initial value length (2 bytes)+ length of padding (variable), signature=A028, padding initial value=Hex number set by caller when the item is created, and <padding>is filled with NULL characters.

The interleaving order of a package can potentially be disturbed by certain operations, such as using a ZIP utility to add or remove a part from the package. When a consumer identifies that an interleaved package is no longer well-ordered, the consumer may abort consumption, produce an error message, or fall back to random access mode and wait for the whole package to arrive.

In order to identify disturbances to a previously well-ordered interleaved package, the ZIP header EXTRA field of the first ZIP archive item can be used by a producer to store an "Interleaving header".

The EXTRA header identifies the ZIP archive as an interleaved archive, and potentially holds additional information about the assumptions the producer made, e.g., working memory size of the device. For each following archive item, the producer adds a ZIP header EXTRA field containing a consecutive sequence number.

For consumers of interleaved packages with sequence numbers stored in the EXTRA field, a number of steps may be taken to ensure the package remains well-ordered. First, the EXTRA field of the first archive item may be inspected. If it indicates interleaving, additional information may be inspected to guard for correct assumptions the producer made about the consumer. Next, for each subsequent archive item, the sequence number stored in the EXTRA field may be inspected. If a sequence number is missing, a switch to random access mode may be made (although one would have to wait for the complete package to arrive). If a sequence number is out of order, items in streaming mode may continue to be received and gaps of sequence numbers may be attempted to be filled. As soon as the gaps are filled, processing may continue. This automatically defaults to random access mode if gaps remain.

Example 2

Mapping to Loose Files in a WINDOWS File System

In order to better understand how to map elements of the exemplary abstract packaging model to a physical representation, consider the basic case of representing a package as a collection of loose files in a WINDOWS file system. Each part in the exemplary package will be contained in a separate file (stream). Each part name in the exemplary abstract packaging model corresponds to the name of the file.

That is, the part logical component corresponds to the file(s) of the physical representation. The part name logical component corresponds to the file name, including the path, of the physical representation. The part content type logical component corresponds to a file containing XML that identifies the content types for each part. The growth hint logical component may be ignored.

To convert an ASCII part name to a WINDOWS file system name, the first character (which will be a "/") is removed. Subsequently, all "a" characters are converted to "\" characters. Next, colon and asterisk characters are escaped using exactly two hexadecimal digits. The colon characters are converted to the sequence "^3a" and the asterisk characters are converted to the sequence "^2a". For instance, the part name /a:b/c/d*xaml becomes the following file name: a^3ab\c\d^2a.xaml.

To perform the reverse mapping, all "\" are converted to "/". A "/" is added to the beginning of the string. The colon and asterisk characters are un-escaped (that is, the sequence "^3a" is converted to a colon character (":") and the sequence "^2a" is converted to an asterisk character ("*"))

When mapping to loose files, interleaved parts are not stored any differently from non-interleaved parts. In other words, each part is stored as a file.

Example 3

Opening a Package

Figure 3:
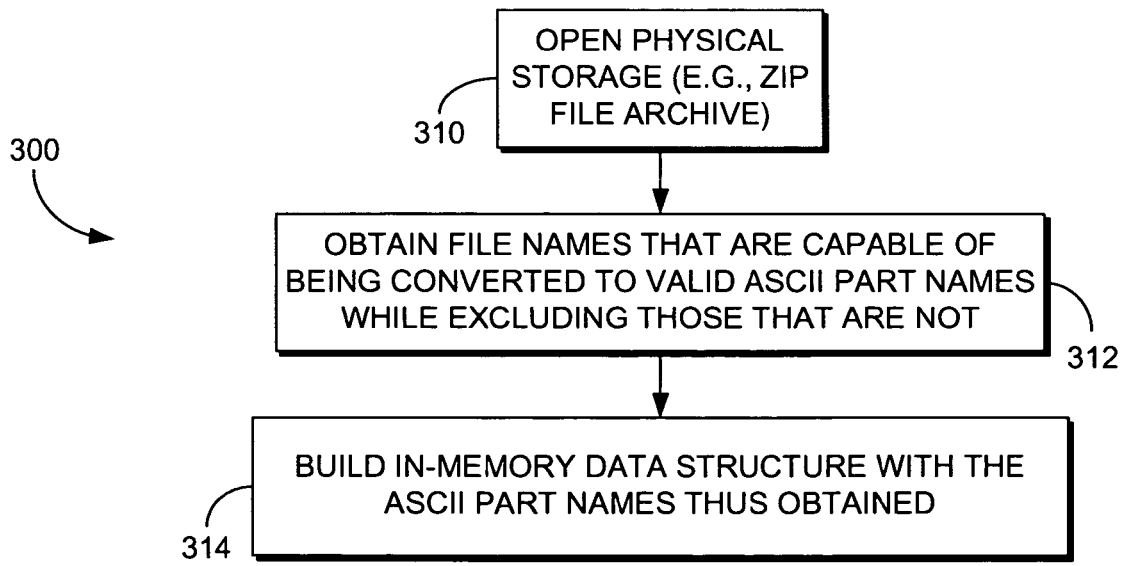
FIG. 3 is a flow diagram showing a method for opening a package when mapping between components of a packaging model and features of a physical representation of a package in accordance with an embodiment of the present invention.

When mapping from the exemplary abstract packaging model herein described to a physical representation, various operations are performed. One such operation is opening a package. With reference to FIG. 3, a flow diagram showing an exemplary method 300 for opening a package in accordance with an embodiment of the present invention is illustrated. Initially, as indicated at block 310, the physical storage/representation (e.g., the ZIP archive) is opened. Subsequently, the file names that are capable of being converted to valid ASCII part names are obtained and those that are not capable of being converted are excluded, as indicated at block 312. Next, an in-memory data structure is built with the ASCII part names thus obtained, as indicated at block 314. This method is described in more detail with reference to FIG. 4. Alternatively, the normalized Unicode string may itself be stored, if desired.

Figure 4:
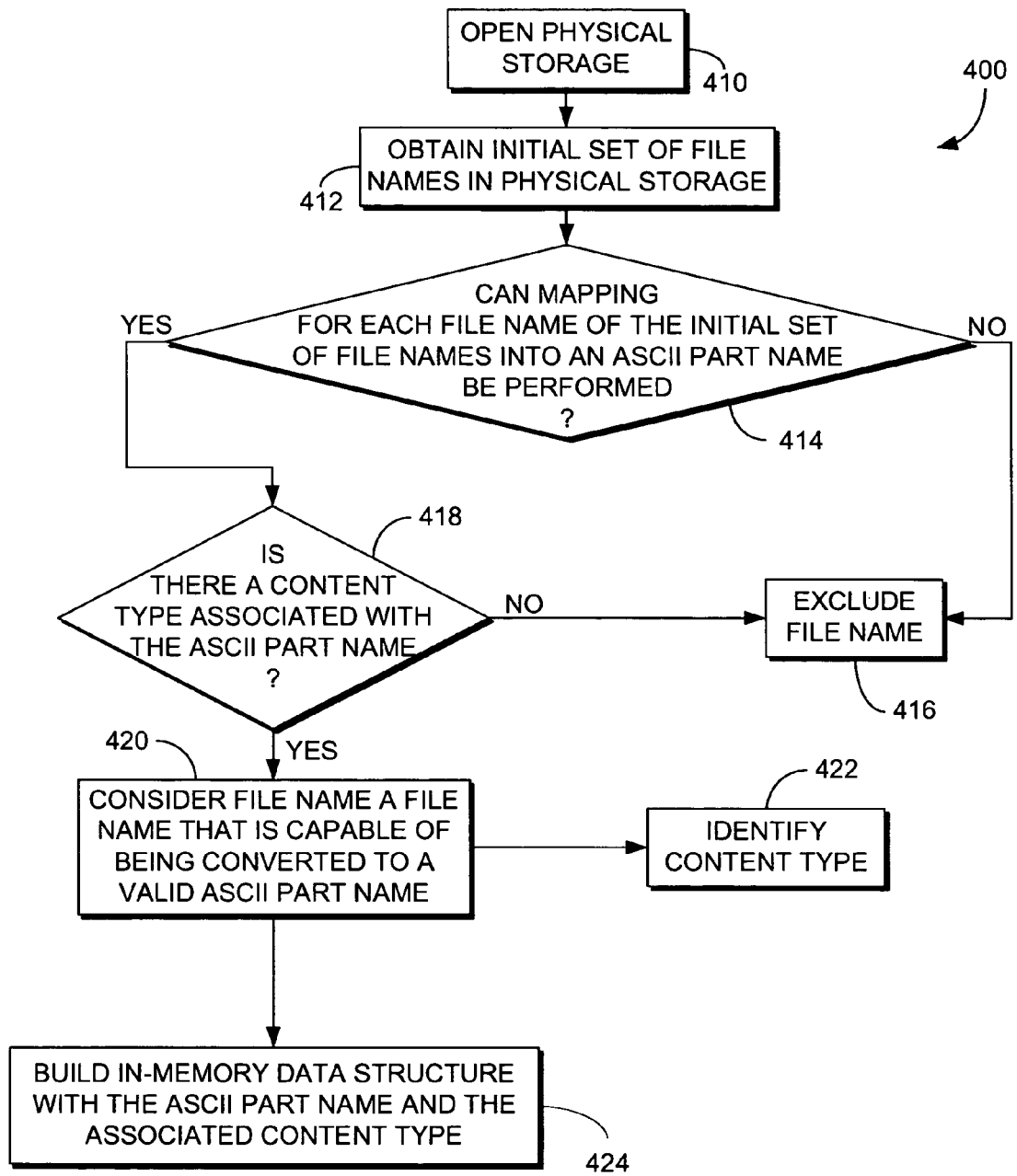
FIG. 4 is a flow diagram showing a method for opening a package when mapping between components of a packaging model and features of a physical representation of a package in accordance with an embodiment of the present invention illustrating more detail than the method shown in FIG. 3.

Referring now to FIG. 4, a flow diagram is illustrated showing a method 400 for opening a package when mapping between components of the exemplary abstract packaging model described herein and features of a physical representation of a package in accordance with an embodiment of the present invention, the method 400 illustrating more detail than the method 300 of FIG. 3. Initially, as indicated at block 410, the physical storage/representation (e.g., a ZIP archive) is opened. Subsequently, an initial set of file names in the physical storage is obtained, as indicated at block 412. For interleaved file names, the actual file name corresponding to a set of interleaved file names is obtained. Next, it is determined whether a mapping for each file name of the initial set of file names into an ASCII part name can be performed. This is indicated at block 414. This determination is made for each file name of the initial set individually. If a mapping cannot be performed, the individual file name is excluded for further processing, as indicated at block 416.

If, however, a mapping for a file name of the initial set into an ASCII part name can be performed, it is next determined whether or not there is a content type associated with the ASCII part name, as indicated at block 418. If there is no content type associated with the ASCII part name, the file name is excluded for further processing, as indicated at block 416.

If a content type is associated with the ASCII part name, the file name is considered a file name that is capable of being converted to a valid ASCII part name, as indicated at block 420, and the content type is identified, as indicated at block 422. A method 500 for mapping file names into ASCII part names in accordance with an embodiment of the present invention is shown in the flow diagram of FIG. 5.

Initially, the Unicode file name is input, as indicated at block 510. Subsequently, the Unicode string is converted to a sequence of UTF-8 octets, as indicated at block 512. Next, each non-ASCII octet is converted to a 3-character sequence of the form % HH, where HH is the hexadecimal representation of the octet value. This is indicated at block 514. Subsequently, the resultant ASCII string is obtained, as indicated at block 516.

In some instances, file names that can be converted to a valid ASCII part name may be obtained as ASCII strings directly and input to convert to the ASCII part name. This is indicated at block 518.

Whether the ASCII string is obtained from the normalized Unicode string or input, any escape-encoded triplets that correspond to the characters "/", "\", and "." are un-escaped, as indicated at block 520. Subsequently, all "\" characters are converted into "/" characters, as indicated at block 522. Next, path compression is applied, as indicated at block 524.

During the path compression, all occurrences of "./", where "." is a complete path segment, are removed from the buffer string. If the buffer string ends with any "." characters, they are removed. Further, all occurrences of "<segment>/../", where <segment> is a complete path segment not equal to "..", are removed from the buffer string. Removal of these path segments is performed iteratively, removing the leftmost matching pattern during each iteration until no matching pattern remains. Next, if the buffer string ends with "<segment>/..", where <segment> is a complete path segment not equal to "..", that "<segment>/.." is removed. Subsequently, those escape-encoded triplets which correspond to unreserved characters are un-escaped.

When testing ASCII part names for equivalency, the names are first converted to Unicode part names. If the resulting Unicocde part names are equivalent, then the ASCII part names are considered equivalent. There should be no duplicates in the ASCII part names when utilizing the exemplary abstract packaging model described herein.

Subsequently, the resultant ASCII part name is obtained, as indicated at block 526.

With reference back to FIG. 4, once the ASCII part name for each normalized Unicode string is obtained, an in-memory data structure is built with the ASCII part names and the associated content types, as indicated at block 424. For successfully opened packages, there must be the in-memory data structure with the ASCII part names and content types.

Example 4

Obtaining the Contents of a Part from a Unicode String

Figure 6:
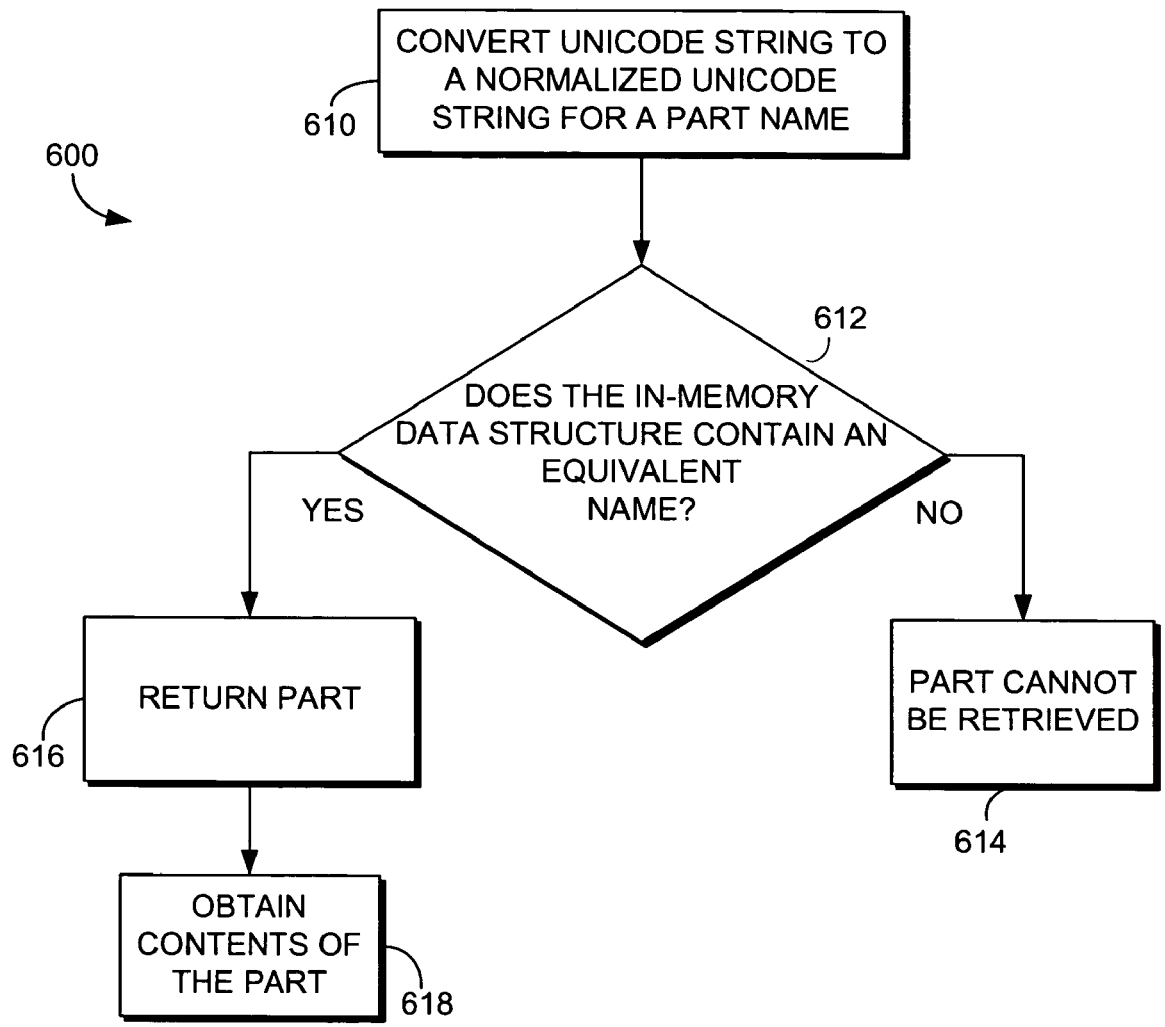
FIG. 6 is a flow diagram showing a method for obtaining the contents of a part from a Unicode string in accordance with an embodiment of the present invention.

With reference to FIG. 6, a flow diagram showing a method for obtaining an ASCII part name, and thereafter the contents of the part, from a Unicode string is illustrated and designated generally as reference numeral 600. Initially, as indicated at block 610, the Unicode string is converted to a normalized Unicode string for a part name. Subsequently, it is determined if an equivalent name is contained in the in-memory data structure. This determination is indicated at block 612. If an equivalent name is not in the in-memory data structure, the contents of the part cannot be retrieved, as indicated at block 614.

If, however, an equivalent name is in the in-memory data structure, the part is returned, as indicated at block 616. Subsequently, the contents of the part may be obtained, as indicated at block 618.

Example 5

Creating a Part from a Unicode String and Content Type

Figure 7:
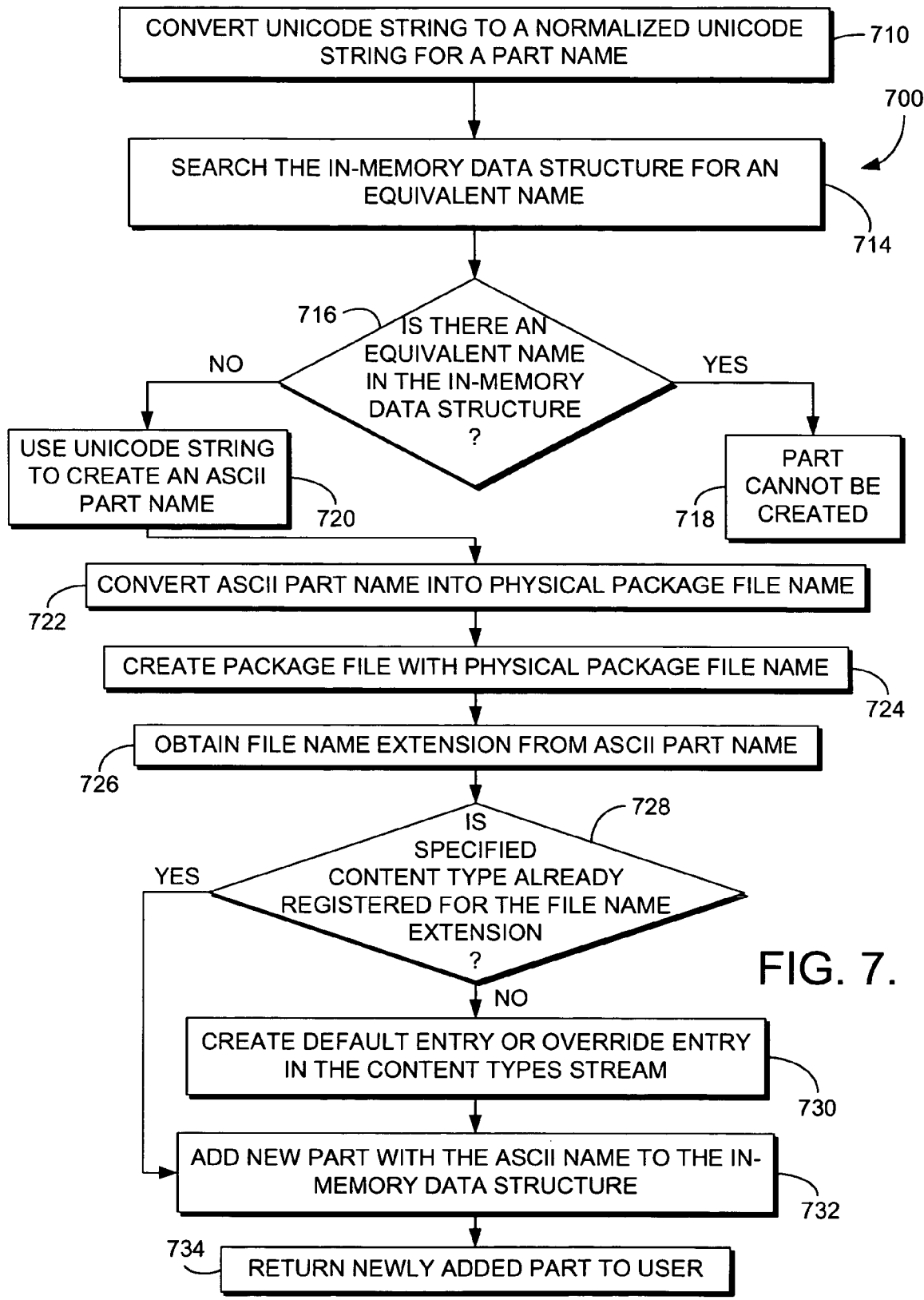
FIG. 7 is a flow diagram showing a method for creating a part from a Unicode string and a content type in accordance with an embodiment of the present invention.

With reference to FIG. 7, a method 700 for creating a part from a Unicode string and a content type in accordance with an embodiment of the present invention is illustrated. Initially, as indicated at block 710, the Unicode string is converted to a normalized Unicode string for a part name (see FIG. 5). Subsequently, the in-memory data structure for is searched for an equivalent part name, as indicated at block 714, and it is determined whether an equivalent name is in the in-memory data structure. This is indicated at block 716. If an equivalent name is in the in-memory data structure, the part cannot be created (as duplicate equivalent part names are not allowed).

Figure 5:
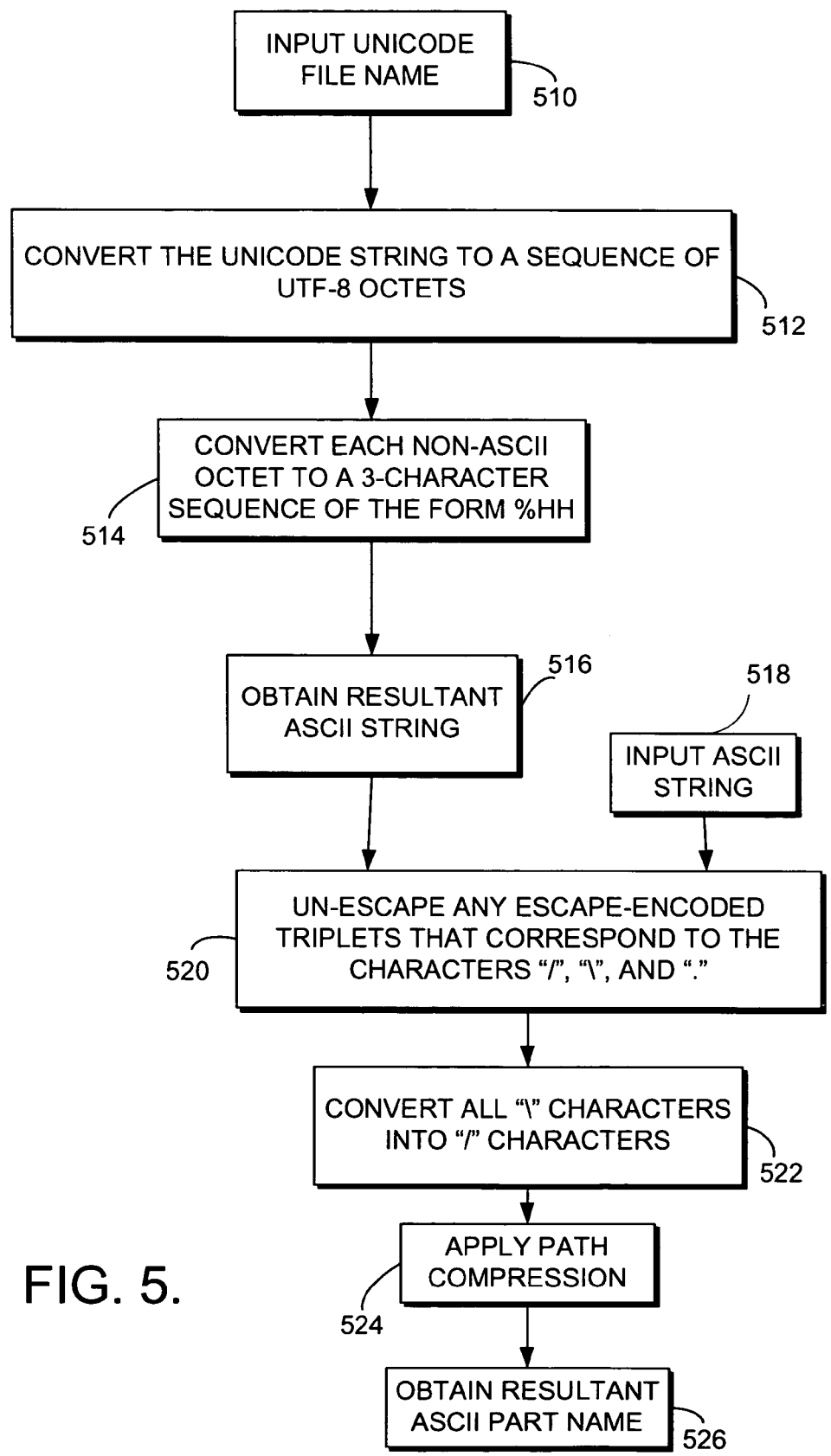
FIG. 5 is a flow diagram showing a method for mapping file names into ASCII part names in accordance with an embodiment of the present invention.

If, however, it is determined that an equivalent name is not in the in-memory data structure, the Unicode string is used to create an ASCII part name, as indicated at block 720 (see FIG. 5). Subsequently, the ASCII part name is converted into a physical package file name, as indicated at block 722. Next, the package file is created with the physical package file name. This is indicated at block 724. Note that the normalized Unicode string is not utilized in this process so as to maintain the casing, etc. as specified in the underlying file format. For interleaving cases, the files are created with the interleaved name.

Subsequently, the file name extension from the ASCII part name is obtained, as indicated at block 726, and it is determined if the specified content type is already registered for the file name extension. This is indicated at block 728. If the specified content type is not already registered for the file name extension, a default entry in the content types stream corresponding to the file extension is created. Alternatively, if there is a default entry but it does not match the content type specified, an override entry in the content types stream is created. This is indicated at block 730.

Once the default or override entry is created, or if the specified content type is already registered for the file name extension, the new part with the ASCII name is added to the in-memory data structure, as indicated at block 732. Subsequently, the newly added part is returned to the user, as indicated at block 734.

Example 6

Removing a Part Based Upon a Specified Unicode String

Figure 8:
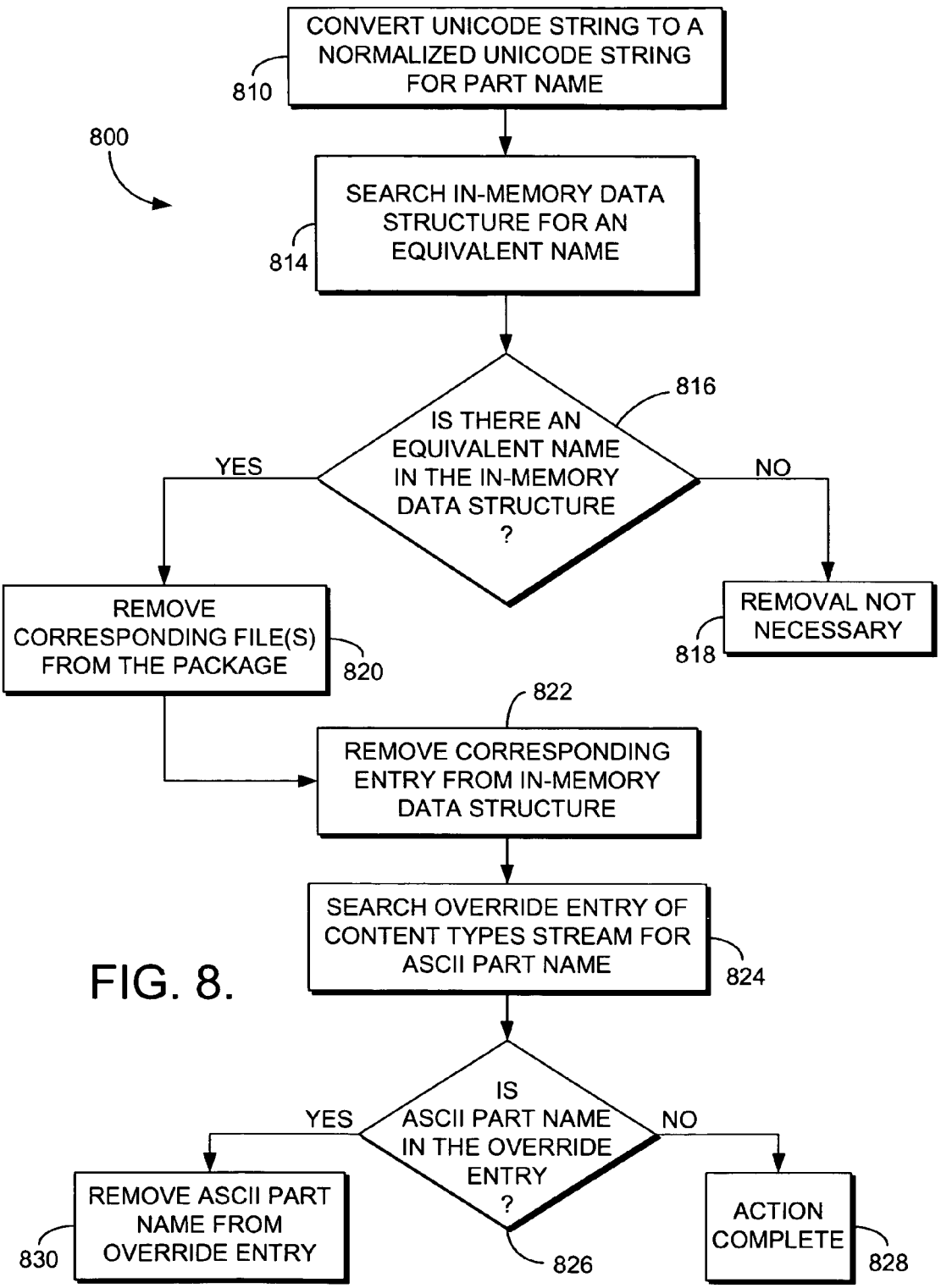
FIG. 8 is a flow diagram showing a method for removing a part based upon a specified Unicode string in accordance with an embodiment of the present invention.

With reference to FIG. 8, a flow diagram is illustrated which shows a method 800 for removing a part based upon a specified Unicode string in accordance with an embodiment of the present invention. Initially, as indicated at block 810, the Unicode string is converted to a normalized Unicode string for a part name (see FIG. 5). Subsequently, the in-memory data structure is searched for an equivalent name, as indicated at block 814, and it is determined whether an equivalent name is in the in-memory data structure. This determination is indicated at block 816. If an equivalent name is not in the in-memory data structure, removal is not necessary, as indicated at block 818.

If, however, an equivalent name is in the in-memory data structure, the corresponding file(s) are removed from the package, as indicated at block 820. Subsequently, the corresponding entry from the in-memory data structure is removed, as indicated at block 822. Next, the override entry of the content types stream for the ASCII part name is searched, as indicated at block 824, and it is determined whether or not the ASCII part name is in the override entry, as indicated at block 826.

If the ASCII part name is not in the override entry, the action is complete, as indicated at block 828. If, however, the ASCII part name is in the override entry, the ASCII part name is removed from the override entry, as indicated at block 830.

As can be understood, embodiments of the present invention provide methods for mapping between components of a packaging model and features of a physical representation of a package. Components of a packaging model may include, by way of example only, a part name, a content type, the contents of a part, and/or a growth hint. Physical representations of a package may include, by way of example only, physical persistence formats and/or various transports, e.g., network-based protocols.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A method for mapping between components of an abstract packaging model and features of each of a plurality of corresponding physical representations of packages, each package having at least one part, the method comprising:

identifying one or more components of the abstract packaging model, wherein identifying one or more components of the abstract packaging model comprises identifying a part growth hint and one or more of a part name, a part content type, and contents of a part, wherein said abstract packaging model can be mapped to a plurality of physical representations each having a different physical format;

identifying a feature of at least one of the plurality of physical representations which corresponds to each of the one or more components identified; and mapping the one or more components of the abstract packaging model to the corresponding feature of the at least one physical representation.

2. The method of claim 1, wherein mapping the one or more components of the abstract packaging model to the corresponding feature of the at least one physical representation comprises utilizing at least one access style, at least one layout style, and at least one communication style.

3. The method of claim 2, wherein mapping the one or more components of the abstract packaging model to the corresponding feature of the at least one physical representation comprises utilizing at least one access style selected from the group consisting of streaming consumption, streaming creation, and simultaneous streaming consumption and creation.

4. The method of claim 2, wherein mapping the one or more components of the abstract packaging model to the corresponding feature of the at least one physical representation comprises utilizing at least one layout style selected from the group consisting of simple ordering and interleaving.

5. The method of claim 4, wherein mapping the one or more components of the abstract packaging model to the corresponding feature of the at least one physical representation comprises:

utilizing the interleaving layout style;

utilizing an interleaving mechanism to break the at least one part into multiple pieces; and providing each of the multiple pieces with a piece name derived from the part name of the at least one part.

6. The method of claim 2, wherein mapping the one or more components of the abstract packaging model to the corresponding feature of the at least one physical representation comprises utilizing at least one communication style selected from the group consisting of sequential delivery and random access.

7. The method of claim 1, wherein identifying one or more components of the abstract packaging model comprises identifying a part content type, wherein the at least one physical representation includes a native mechanism for representing the part content type, and wherein mapping the one or more components of the abstract packaging model to the corresponding feature of the at least one physical representation comprises utilizing the native mechanism therefore.

8. The method of claim 1, wherein identifying one or more components of the abstract packaging model comprises identifying a part content type, wherein the at least one physical representation does not include a native mechanism for representing the part content type, and wherein mapping the one or more components of the abstract packaging model to the corresponding feature of the at least one physical representation comprises:

defining a part content types stream in the at least one physical representation; and mapping the part content type to the part content types stream.

9. The method of claim 8, wherein the part content types stream contains at least one of a matching default element and a matching override element.

10. The method of claim 9, wherein the matching default element comprises at least one definition of a default mapping from an extension of a part name to a content type.

11. A method for mapping between components of an abstract packaging model and features of each of a plurality of corresponding physical representations of packages, each package having at least one part, the components including at least a part name, a part content type, contents of a part, and a growth hint, the method comprising:

identifying a plurality of components of the abstract packaging model, the plurality of components comprising a part name, a part content type, and contents of a part, wherein said abstract packaging model can be mapped to a plurality of physical representations each having a different physical format;

identifying a feature of at least one of the plurality of physical representations which corresponds to each of the part name, the part content type, and the contents of the part;

identifying a feature of the at least one physical representation which corresponds to the growth hint;

mapping the growth hint to the identified feature of the at least one physical representation;

determining whether the at least one physical representation includes a native mechanism for representing the part content type; and mapping each of the part name, the part content type, and the contents of the part to the feature of the at least one physical representation which corresponds thereto, wherein if the at least one physical representation does not include a native mechanism for representing the part content type, mapping each of the part name, the part content type, and the contents of the part to the feature of the at least one physical representation which corresponds thereto comprises:

defining a part content types stream in the at least one physical representation; and mapping the part content type to the part content types stream.

12. The method of claim 11, wherein if the at least one physical representation includes a native mechanism for representing the part content type, mapping each of the part name, the part content type, and the contents of the part to the feature of the at least one physical representation which corresponds thereto comprises mapping the part content type utilizing the native mechanism.

13. The method of claim 11, wherein mapping each of the part name, the part content type, and the contents of the part to the feature of the at least one physical representation which corresponds thereto comprises utilizing at least one access style, at least one layout style, and at least one communication style.

14. The method of claim 13, wherein mapping each of the part name, the part content type, and the contents of the part to the feature of the at least one physical representation which corresponds thereto comprises:

utilizing an interleaving layout style;

utilizing an interleaving mechanism to break the at least one part into multiple pieces; and providing each of the multiple pieces with a piece name derived from the part name of the at least one part.

15. The method of claim 13, wherein the at least one access style comprises streaming consumption.

16. The method of claim 13, wherein the at least one access style comprises simultaneous streaming consumption and creation.

* * * * *

UNITED STATES PATENT AND TRADEMARK OFFICE
CERTIFICATE OF CORRECTION

PATENT NO. : 7,523,392 B2  Page 1 of 1
APPLICATION NO. : 11/112602
DATED : April 21, 2009
INVENTOR(S) : Jerry J. Dunietz et al.

It is certified that error appears in the above-identified patent and that said Letters Patent is hereby corrected as shown below:

In Face page, in field (75), under "Inventors" column 1, line 5, delete "Charels" and insert -- Charles --, therefor.

Signed and Sealed this
Third Day of May, 2011

David J. Kappos
*Director of the United States Patent and Trademark Office*